United States Patent [19]  
Brodie et al.

[11] 3,935,743  
[45] Feb. 3, 1976

[54] TEMPERATURE INDICATORS

[76] Inventors: Donald E. Brodie, 706 Briarwood Court; Matthew Camarota, 904 Gainsway Road, both of Yardley; Charles R. Jankowski, 109 Lions Drive, Morrisville, all of Pa. 19067

[22] Filed: July 15, 1974

[21] Appl. No.: 488,513

[52] U.S. Cl. ............. 73/343 R; 73/356; 73/358; 116/114.5
[51] Int. Cl.² ........................................ G01K 11/08
[58] Field of Search ............. 73/358, 356, 343 R; 116/114.5

[56] References Cited
UNITED STATES PATENTS
3,430,491  3/1969  Gignilliat ........................ 73/356
3,782,194  1/1974  Brodie et al. .................... 73/358

FOREIGN PATENTS OR APPLICATIONS
227,569  1/1925  United Kingdom ............ 73/343 R OTHER PUBLICATIONS
Donald Duck by Walt Disney; from Washington Post, June 13, 1951, p. 14B.
Skuse's Complete Confectioner, 13th Edition, 1957, pp. 45 and 46.

*Primary Examiner*—S. Clement Swischer
*Assistant Examiner*—Denis E. Corr
*Attorney, Agent, or Firm*—Ostrolenk, Faber, Gerb & Soffen

[57] ABSTRACT

A temperature indicator which in one preferred embodiment comprises a translucent or transparent confectionery head having a cavity therein. A flexible elongated resilient stem, preferably formed of a plastic material has one end thereof, which is provided with a plurality of small holes, inserted into the cavity. Each of the holes is at least partially filled with a temperature sensitive material capable of melting at a temperature typically within the range from 96° to 110° F With each material mounted within a hole being adapted to melt at a different temperature within the aforesaid range. The material filling each hole within the stem is preferably of a color which contrasts with the material in the other holes for ease of identification. One or more of the materials in each hole will melt depending upon the temperature of the individual ingesting the lollipop. Each temperature sensitive material is completely non-toxic and may be ingested together with the confectionery head without any danger of harming the user. The confectionery member may also take the form of a pacifier.

The holes in the one end of the stick may either be partially or completely filled with temperature sensitive material. Alternatively the stick may be provided with grooves enabling the melting material to be drained away from the holes. Those temperature sensitive materials which have melted are easy to identify due to the fact that the melted material substantially completely leaves the holes in the stick causing the colored material to effectively disappear, leaving only the hole.

8 Claims, 7 Drawing Figures

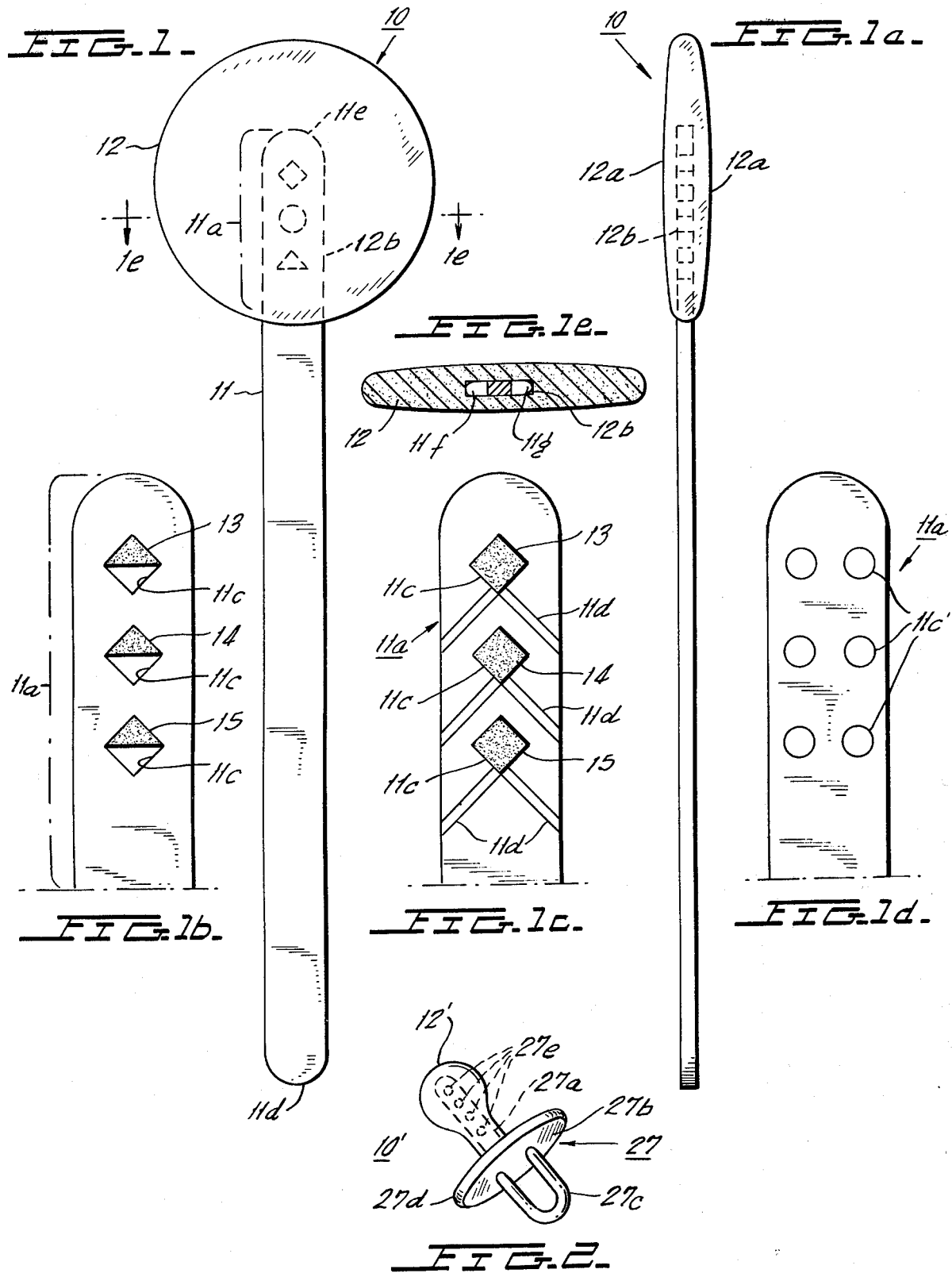

TEMPERATURE INDICATORS

The present invention relates to temperature sensitive devices and more particularly to temperature sensitive devices housed within confectionery members, the temperature sensitive elements being adapted to melt at a particular temperature level and being completely non-toxic.

BACKGROUND OF THE INVENTION

Whenever a child complains of being ill it is normally quite important to determine whether a child has a fever. Whereas glass thermometers have typically been employed for taking someone's temperature, the potential dangers attending the use of glass thermometers are significantly magnified when dealing with children. One satisfactory solution for avoiding the inherent dangers of glass thermometers has resulted in the confectionery type of temperature indicator described in our U.S. Pat. NO. 3,782,194 issued Jan. 1, 1974. The temperature indicator in one embodiment described therein comprises an elongated member having one end thereof inserted into a cavity provided within a confectionery head which is preferably transparent. The aforesaid end of the rigid member is inserted into the cavity to form a fully enclosed interior space in which a temperature indicator element is deposited. The temperature indicator element is preferably of a particular shape or configuration such as for example conical and preferably is of a color which contrasts with the color of the confectionery head. By placing the lollipop in the mouth, the elevated temperature of the oral cavity causes the temperature sensitive element to melt and thereby change its shape so as to effectively disappear. Since the temperature sensitive element melts at a discrete temperature level, the temperature indicator thereby provides means for determining that the child has a temperature of at least the level of the temperature sensitive element, that has melted or effectively disappeared.

In order to determine the particular temperature level of the child more specifically, a plurality of temperature sensitive elements, each adapted to melt at a different temperature, may be embedded within the confectionery member. Thus, if at least one of the temperature sensitive elements does not melt, an upper limit of the child's temperature will be accurately indicated. For example, by providing a sufficient number of temperature sensitive elements, each adapted to melt at temperatures of 1° or 1½° increments from every other element, an accurate determination of the child's temperature becomes attainable.

BRIEF DESCRIPTION OF THE INVENTION

The present invention is characterized by a confectionery type temperature indicator which, retains all the advantages of the confectionery member described in our aforementioned patent, and which enhances the applicability of the device described in U.S. Pat. No. 3,782,194 and greatly simplifies production techniques through the utilization of a flexible resilient stem which is provided with small openings for receiving each temperature indicating element. The portion of the stem having the temperature sensitive elements therein is embedded within the head of a confectionery member which is preferably translucent or transparent. Each of the temperature sensitive elements is quite small and is adapted to melt and effectively disappear so as to leave an empty hole or void previously occupied by the temperature sensitive element. Since each temperature sensitive element is of a contrasting color relative to every other temperature sensitive element, and relative to the confectionery head, it is quite easy to make a temperature reading. Each of the temperature sensitive elements is formed of a non-toxic material and mixed with a suitable non-toxic dye so that ingestion of a temperature sensitive element has no harmful effect upon the patient.

The confectionery head may also be molded in the form of an infant's pacifier and utilized in the same manner as the first preferred embodiment described herein above.

BRIEF DESCRIPTION OF THE INVENTION AND OBJECTS

It is therefore one object of the present invention to provide an ingestible non-toxic temperature sensitive device of simplified design and having a confectionery head which may be totally ingested without harm to the user.

Another object of the present invention is to provide a novel confectionery type temperature sensor comprised of a confectionery head and a resilient flexible stem having a plurality of temperature sensitive elements imbedded within the stem and of contrasting color to the other temperature sensitive elements as well as the confectionery head, to facilitate both a determination of the user.

Still another object of the present invention is to provide a novel confectionery type temperature sensor and simplified design comprised of a confectionery head and a resilient flexible stem having a plurality of temperature sensitive elements imbedded in the stem within holes of differing configurations and contrasting colors relative to the confectionery head to facilitate both a determination of the temperature of the user.

The above as well as other objects of the present invention will become apparent when reading the accompanying description and drawings in which:

FIG. 1 is a plan view of a confectionery type temperature indicator embodying the principles of the present invention.

FIG. 1a shows an end view of the temperature indicator of FIG. 1.

FIG. 1b is an enlarged plan view of one end of the stem shown in FIG. 1.

FIG. 1c shows a slightly modified arrangement of the embedded portion of the stem of FIG. 1b.

FIG. 1d shows still another modified view of the embedded portion of the stem.

FIG. 1e is a sectional view of the indicator head of the FIG. 1 looking in the direction of arrows 1e—1e.

FIG. 2 is a plan view showing a pacifier which embodies the principles of the present invention.

DETAILED DESCRIPTION OF THE INVENTION

FIGS. 1 through 1b show an indicator 10 embodying the principles of the present invention and which is comprised of an elongated preferably flat stem 11 which is formed of a flexible resilient non-toxic material such as paper, plastic or any other material exhibiting the requisite flexibility and resiliency. Indicator 10, which is commonly referred to as a lollipop, is further comprised of a confectionery head 12 having a substantially circular shaped periphery as can best be seen in FIG. 1. Each side of 12a of the confectionery head is preferably formed with a curvature which anatomically is adapted to fit the roof of the mouth of a patient. Another advantage gained from this convex contour is the magnifying effect which the confectionery head provides to further facilitate visual observation of the temperature indicating elements as will be more fully described hereinbelow.

The confectionery head is provided with an opening which, in cross-section, is a substantially narrow rectangular shaped opening 12b in which the top portion 11a of stem 11 is embedded.

Top portion 11a of stem 11 is provided with a plurality of diamond shaped or round or other suitable shaped openings 11c (FIG. 1b) which extend completely through the thickness of stem 11. Considering initially FIG. 1b, each opening houses a triangular shaped temperature sensitive element which is formed of a suitable wax which has been admixed with a non-toxic dye. One preferred material may be a hydrocarbon wax adapted to melt at a predetermined temperature in the range, for example, from 96°F to 110°F. FIG. 1b shows three triangular shaped temperature sensitive elements 13, 14 and 15. In one preferred embodiment each element may be admixed with a non-toxic dye of a different color. For example, the elements 13, 14 and 15 may be red, yellow and green respectively and may be respectively adapted to melt at temperature levels of 102°F, 101°F and 100°F.

The confectionery head may be formed from any one or a combination of a variety of sugars. It has been found that barley sugar produces a smooth colorless and sweet lollipop head having excellent transparency, solubility and temperature range stability. However, any other confectionery material may be employed which provides the above characteristics and which is adapted to permit unimpeded observation of each of the temperature sensing elements.

Observation of the confectionery member 10 prior to placement in the mouth, shows each of the individual elements 13–15 to be clearly visible. After a suitable time period during which the confectionery head 12 is ingested none, one, more than one or all of the elements will be caused to melt due to the temperature level within the oral cavity.

To determine the temperature of the child, the confectionery head is removed from the mouth and observed. Those elements which have melted effectively disappear leaving only the holes, or voids which contrast with the unmelted elements as well as contrasting with the preferably opaque stem 11 to greatly simplify the reading of the element 10.

In another preferred embodiment as shown, for example, in FIG. 1c, each of the openings may be totally filled with a temperature sensitive material such as the element 13 of FIG. 1c. To facilitate the complete removal or draining of the temperature sensitive material 13, draining grooves 11d may be cut or otherwise formed in one or both sides of stem 11. Observation for taking a temperature reading is substantially the same as that described hereinabove for the embodiment of FIGS. 1 through 1b.

FIG. 1d shows still another preferred embodiment of the present invention wherein portion 11a of stem 11 is formed or otherwise provided with a plurality of circular openings 11c' each adapted to be either partially or fully filled with a temperature sensitive element of a material or mixture which is admixed with a non-toxic dye so that the element provided in each opening 11c' is of a contrasting color relative to all of the other elements and so that each material is adapted to melt at a different predetermined temperature level. For example, in an embodiment provided with six openings 11c', the elements in each opening may be respectively adapted to melt at temperatures of 98°F, 99°F, 100°F, 101°F, 102°F and 103°F. Obviously, a greater or lesser number of openings may be provided in portion 11a of stem 11. Providing one opening with a temperature sensitive material adapted to melt near normal body temperature serves to provide positive assurance of the proper operation of the confectionery temperature indicator. For example, the colored wax in one opening may be adapted to melt at a temperature of 98°F with each additional element being adapted to melt at temperature levels of one degree increments. Thus the element adapted to melt at 98°F will provide positive assurance of the proper operation of the confectionery indicator.

If desired, the embodiment of FIG. 1d may also be provided with drain grooves for each opening in the manner shown in FIG. 1c.

FIG. 2 shows another preferred embodiment 10° of the present invention in which the confectionery member is in the form of an infant's pacifier. Confectionery head 12' is formed in the shape of a candy nipple having a cavity 12b' for receiving the stem 27a integrally joined to a circular shaped disc portion 27b whose opposite surface has integrally joined thereto a U-shaped handle 27c comprising the structure 27. The element 27 may be molded in a single molding operation and is preferably formed of a material having suitable resilience to prevent injury to the child. The periphery of 27d of disc shaped portion 27b may be smooth and rounded and the handle 27c may preferably have a circular cross-sectional configuration so as to eliminate any sharp corners or edges which might otherwise cause harm to an infant. The stem 27a is provided with openings 27e for receiving temperature sensitive elements of the type described hereinabove and may be embedded within the cavity 12b' in confectionery head 12' which is adapted to incorporate all of the characteristics of the confectionery head 12 described hereinabove. Since the temperature sensitive materials inserted within each opening 27e is totally non-toxic the confectionery head as well as the temperature sensitive materials may be completely ingested without any danger of harming the infant.

The temperature sensitive materials could of course be admixed with appropriate colored dyes to provide the contrasting colors as between each of the materials and the preferably opaque stem portion 27a to greatly facilitate the taking of a temperature reading.

As an alternative arrangement, and either in place of or in addition to the contrasting coloring of each of the temperature sensitive elements, the openings in stem 11 may be of contrasting shape. For example, note FIG. 1 in which the openings 11c are respectively shown as being diamond shaped, circular and triangular. With this arrangement, so long as the temperature sensitive elements are of a color which contrasts with the confectionery head 12, an observation of the configuration of the opening may be utilized to identify the temperature level for the element which had melted and effectively disappeared. Thus the elements may be either of contrasting colors or the same color since the shape of the openings may be employed to distinguish between each of the elements. If desired, the relative positions of the openings may likewise be employed to identify the temperature level; identification may then be made on the basis of a printed information sheet package with the temperature indicator or alternatively the temperature level at which each element melts may be printed directly upon stem 11 immediately adjacent each temperature sensitive element which may be obtained through the use of a non-toxic ink or by molding the numbers directly into the stem.

It can be seen from the foregoing description that the present invention provides a novel confectionery type temperature indicator which is quite safe for use in taking the temperature of a child or infant and which is easy to use and may be manufactured quite inexpensively and in large quantities.

Although this invention has been described with respect to preferred embodiments, it should be understood that many variations and modifications will now be obvious to those skilled in the art, and it is preferred, therefore, that the scope of this invention be limited; not by the specific disclosure herein, but only by the appended claims.

What is claimed is:

1. A temperature sensitive device especially adaptable for use in taking a child's temperature comprising:
    a confectionery body having a cavity extending to at least one end thereof;
    an elongated flexible resilient stem having a first end thereof inserted into said cavity;
    said first end having at least one opening provided completely therethrough which is substantially completely enclosed by said confectionery member when the first end of the stem is positioned in the confectionery head; said opening being in the shape which would be formed by a plane geometrical figure passing through said stem;
    a temperature sensitive element at least partially filling said opening in said stem;
    said confectionery head having at least a portion thereof which is substantally transparent so as to facilitate observation of the temperature sensitive element in said opening from either direction transverse to the plane of said opening;
    said temperature sensitive element being of a contrasting color relative to the substantially transparent portion of the confectionery member through which it is viewed;
    said element adapted to be substantially completely melted at a predetermined temperature level so as to substantially completely flow out of said opening and thereby effectively disappear from said stem to provide a positive indication of the predetermined temperature level.

2. The device of claim 1 wherein said temperature sensitive element is comprised of a non-toxic hydrocarbon wax admixed with a non-toxic dye.

3. The device of claim 1 wherein a plurality of holes are provided in the first end of said stem and wherein a plurality of temperature sensitive elements are provided in each of said openings so as to at least partially fill each of said openings; each of said temperature sensitive elements being adapted to melt at different temperature levels and each of said temperature sensitive elements being of a contrasting color relative to the remaining temperature sensitive elements to facilitate determination of the temperature of the person ingesting the temperature sensitive device.

4. The device of claim 3 wherein the temperature sensitive elements completely fill each of the openings in which they are deposited.

5. The device of claim 1 wherein said first end of said stem is provided with a plurality of openings of different configurations and wherein each of said openings contains a temperature sensitive element at least partially filling each of said openings and each being of a contrasting color relative to said confectionery head, said contrasting openings being adapted to facilitate the temperature of the person ingesting the confectionery head.

6. The device of claim 1 wherein said stem is further provided with a disc portion joined to said first end and a substantially U shaped handle;
    said confectionery head being in the form of a nipple completely enclosing said stem whereby said confectionery head and said stem structure collectively form a structure resembling a child's pacifier.

7. The device of claim 3 wherein the openings in said elongated member are of differing configurations, with each opening being adapted to receive temperature sensitive elements of differing melting points.

8. A temperature sensitive device especially adaptable for use in taking a child's temperature comprising:
    a confectionery body having a cavity extending to at least one end thereof;
    an elongated flexible resilient stem having a first end thereof inserted into said cavity;
    said first end having at least one opening provided therein which is substantially completely enclosed by said confectionery member when the first end of the stem is positioned in the confectionery head;
    a temperature sensitive element at least partially filling said opening in said stem;
    said confectionery head having at least a portion thereof which is substantially transparent so as to facilitate observation of the temperature sensitive element in said opening;
    said temperature sensitive element being of a contrasting color relative to the substantially transparent portion of the confectionery member through which it is viewed;
    said element adapted to be substantially completely melted at a predetermined temperature level so as to substantially completely flow out of said opening and thereby effectively disappear to provide a positive indication of the predetermined temperature level;
    at least one drain groove provided along at least one side of said stem wherein said drain groove extends between said opening and one edge of said stem to provide a trough for removal of the temperature sensitive element upon melting thereof.

* * * * *